United States Patent Office 3,575,963
Patented Apr. 20, 1971

3,575,963
5,5aβ,13,13aβ - TETRAHYDRO-5β,13β-DIHYDROXY-8H,16H - 7a,15a - (EPITRITHIO OR EPITETRATHIO) - 7H,15H - BISOXEPINO[3',4':-4,5]PYRROLO [1,2-a:1',2'-d]PYRAZINE-7,15-DIONE, DIACETATE
Keith Chadwick Murdock and Robert Bruce Angier, Pearl River, N.Y., assignors to American Cyanamid Company, Stamford, Conn.
No Drawing. Continuation-in-part of abandoned application Ser. No. 747,429, July 25, 1968. This application Jan. 22, 1969, Ser. No. 793,163
Int. Cl. C07d 93/36, 93/00
U.S. Cl. 260—239.3      6 Claims

ABSTRACT OF THE DISCLOSURE

This disclosure describes 5,5aβ,13,13aβ-tetrahydro-5β,13β-dihydroxy-8H, 16H-7a,15a-(epitritho or epitetrathio)17H,15H - bisoxepino[3',4':4,5]pyrrolo[1,2 - a:1',2'-d]pyrazine-7,15-dione, diacetate, new compounds useful as antiviral agents.

CROSS-REFERENCE TO RELATED APPLICATION

This applicaiton is a continuation-in-part of our co-pending application Ser. No. 747,429, filed July 25, 1968, now abandoned.

BRIEF SUMMARY OF THE INVENTION

This invention relates to new antiviral compounds, 5,5aβ,13,13aβ-tetrahydro - 5β,13β - dihydroxy-8H,16H-7a,15a - epitrithio - 7H,15H - bisoxepino[3',4':4,5]pyrrolo[1,2-a:1',2'-d]pyrazine - 7,15 - dione, diacetate (I) and 5,5aβ,13,13aβ - tetrahydro - 5β,13β - dihydroxy-8H, 16H-7a,15a-epitetrathio - 7H,15H - bisoxepino[3',4':4, 5]pyrrolo[1,2-a:1',2'-d]pyrazine - 7,15 - dione, diacetate (II), which may be represented by the following structural formulae:

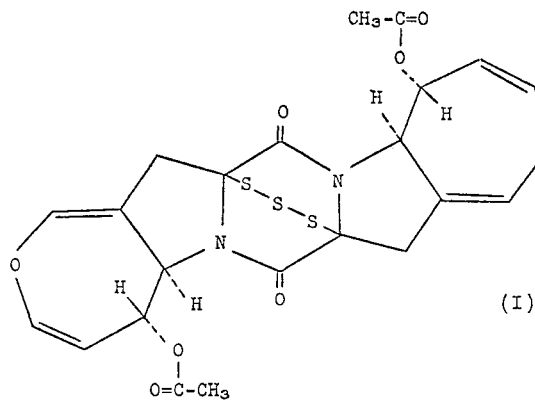

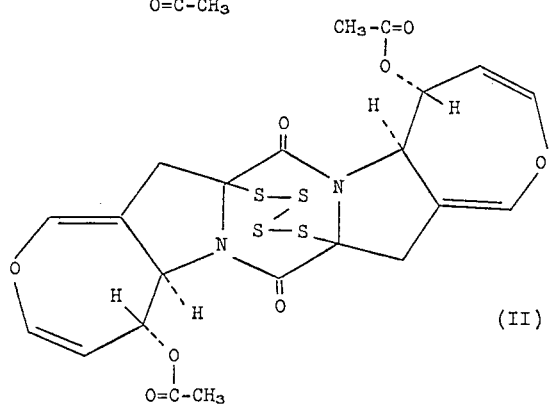

The invention includes within its scope the antiviral compounds in dilute forms, as crude concentrates, and in pure crystalline form as well as methods of preparing the antiviral compounds. The novel antiviral compounds of the present invention are active against a broad range of RNA viruses including strains of rhino-, Coxsackie and parainfluenza viruses.

DETAILED DESCRIPTION OF THE INVENTION

The new antiviral compounds of the present invention may be readily prepared from 5,5aβ,13,13aβ-tetrahydro-5β,13β-dihydroxy-8H,16H,7a,15a - epidithio - 7H,15H-bisoxepino[3',4':4,5]pyrrolo[1,2 - a:1',2' - d]pyrazine-7, 15-dione, diacetate (III) in accordance with the following reaction scheme (partial structures only shown):

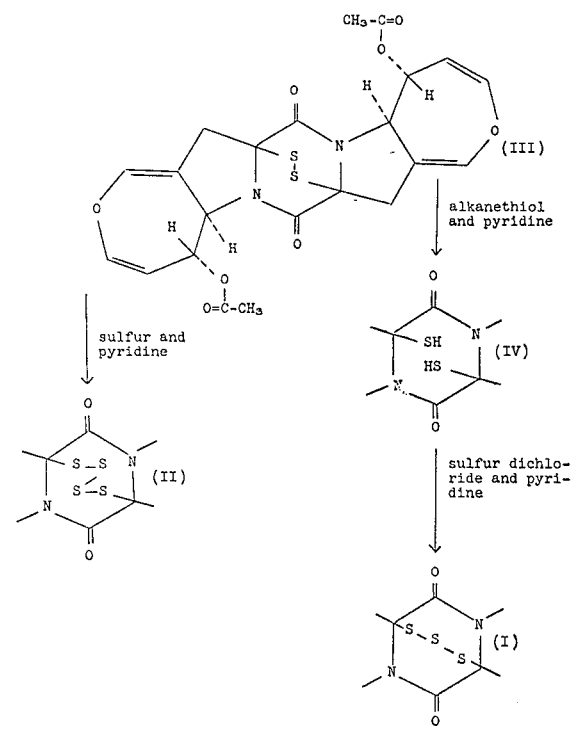

The conversion of the 7a,15a-epidithio starting material (III) to the 7a,15a-epitetrathio product (II) involves essentially the addition of two additional sulfur atoms into the nucleus of the molecule. An excess of sulfur is ordinarily used to force the reaction towards the epitetrathio product (II). A non-aqueous basic solvent is used and although pyridine has been found to be preferable, other such solvents as, for example, quinoline likewise may be used. The reaction can be carried out at temperatures ranging from about 10° C. to about 50° C. but temperatures near 25° C. have been found to be preferable and convenient.

The conversion of the 7a,15a-epidithio starting material (III) to the 7a,15a-dimercapto intermediate (IV) is accomplished by treating the epidithio starting material (III) with an excess of hydrogen sulfide or a lower alkyl mercaptan such as methyl mercaptan, ethyl mercaptan, n-butyl mercaptan, etc., in a non-aqueous basic solvent. Although pyridine has been found to be preferable, other such solvents as, for example, quinoline and isoquinoline likewise may be used. The reaction can be carried out at temperatures ranging from about 10° C. to about 50° C. but temperatures near 25° C. are preferred. The conversion of the 7a,15a-epidithio starting material (III) to the 7a,15a-dimercapto intermediate (IV) may also be accomplished by treating the epidithio starting material (III) with sodium borohydride in pyridine or a methanol-chloroform mixture. The conversion of the 7a,15a-dimercapto intermediate (IV) to the 7a,15a-epitrithio product (I) is accomplished by treating the dimercapto intermediate (IV) with about an equimolar amount of sulfur dichloride in a non-aqueous basic solvent. Although pyridine is preferred, other such solvents as, for example, quinoline and isoquinoline may also be used. The reaction is preferably carried out at temperatures near 25° C. although temperatures ranging from about 10° C. to about 50° C. may be used.

The starting material 5,5a$\beta$,13,13a$\beta$-tetrahydro-5$\beta$, 13$\beta$ - dihydroxy - 8H,16H - 7a,15a-epidithio-7H,15H-bisoxepino[3',4':4,5]pyrrolo[1,2 - a:1',2' - d]pyrazine-7,15-dione, diacetate (III) is formed during the cultivation under controlled conditions of strains of *Aspergillus terreus*. *Aspergillus terreus* has been described, based on diagnostic characteristics observed, in the book The Genus Aspergillus by K. B. Raper and D. I. Fennell, Williams & Wilkins Company, Baltimore, Maryland, 1965, pages 568 to 572. Typical strains of *Aspergillus terreus* which will produce the epidithio compound (III) by fermentative bisosynthesis are the following: NRRL 255; NRRL 265; NRRL 571; NRRL 1913; NRRL 1921; NRRL 3319; ATCC 12238.

Viable subcultures of these strains are freely available to the public from the Northern Regional Research Laboratory, Peoria, Illinois or from the American Type Culture Collection, Washington, D.C.

Cultivation of the organism *Aspergillus terreus* for the production of the epidithio compound (III) is carried out in liquid culture media. Aeration in tanks and bottles is provided by forcing sterile air through or onto the surface of the fermenting medium. Further agitation in tanks is provided by a mechanical impeller. An antifoaming agent, such as 1% octadecanol in lard oil, may be added as needed.

Shaker flask inoculum of *Aspergillus terreus* is prepared in 500 milliliter flask by inoculating 100 milliliters of sterile liquid medium with scrapings or washings of spores from an agar slant of the culture. The following medium is preferably used.

|  | Grams |
|---|---|
| Cerelose | 15 |
| Sucrose | 15 |
| Sodium nitrate | 2 |
| Potassium acid phosphate | 1 |
| Magnesium sulfate·7H$_2$O | 0.5 |
| Potassium chloride | 0.5 |
| Ferrous sulfate·7H$_2$O | 0.01 |
| Beef extract | 0.5 |
| Yeast extract | 0.125 |

Water to 1,000 milliliters.

The flasks are incubated at a temperature from 25–29° C., preferably 28° C., and agitated vigorously on a rotary shaker for 30 to 48 hours. These 100 milliliter inocula are used to inoculate 1 liter and 12 liter batches of the same medium in 2 liter and 20 liter glass fermentors. The inoculum mash is aerated with sterile air while growth is continued for 30 to 48 hours. These batches of inocula are used to inoculate tank fermentors.

For the production of the epidithio compound (III) in tank fermentors, the fermentation medium used preferably is the same as the inoculum medium previously described. Each tank is inoculated with 3 to 10% of inoculum obtained as described in Example 1. Aeration is supplied at the rate of 0.1–0.5 liter of sterile air per liter of broth per minute and the fermenting mixture is agitated by an impeller driven at 150–300 r.p.m. The temperature is maintained at 25–29° C., usually at 28° C. The fermentation is ordinarily continued for 80–120 hours, at which time the mash is harvested.

After the fermentation is completed, the fermented mash containing the epidithio compound (III) is filtered at the existing pH to remove the mycelium. Diatomaceous earth or any other conventional inert filtration aid may be used to assist filtration. Ordinarily the mycelial cake is washed with water and the wash is pooled with the filtrate. The pH of the combined filtrate and washings is adjusted to 5.0 to 5.4 with acid, preferably hydrochloric acid. The adjusted solution is then extracted with two portions of chloroform, each portion being about 10% of the volume of combined filtrate and washings. The combined chloroform extracts are concentrated at temperatures from 30° to 40° C. to a volume slightly more than 1% of the original combined filtrate and washings. The chloroform concentrate thus obtained is further concentrated in a rotary evaporator to yield a viscous, black syrup which is subsequently dried under reduced pressure. The resultant dry material is extracted with a small portion of chloroform and the residue insoluble material is discarded. The chloroform extract is evaporated to dryness under reduced pressure and the dry residue is dissolved in boiling ethanol. A crystalline material is obtained on cooling the ethanolic solution. This material is separated by filtration and the solid is recrystallized from benzene, or from a mixture of acetone and cyclohexane yielding the epidithio compound (III) as light tan crystals.

Slight variations in the described procedure are permitted if desired. For example, instead of concentrating the chloroform extracts to dryness, absolute alcohol may be added to the chloroform concentrate before dryness is reached. Further concentration of this mixture initiates precipitation of crude product while cooling of the suspension below room temperature or preferably 3–5° C. precipitates additional epidithio product.

Isolation of the epidithio product (III) may be monitored throughout the process using thin layer chromatography techniques carried out on Eastman Chromagram K301R or on plates precoated with Gel F$_{254}$ manufactured by E. Merck A. G., Darmstadt, Germany and distributed by Brinkmann, Long Island, N.Y. Chloroform or a mixture of chloroform and ethyl acetate (1:1 by volume) is used to develop the plates. Zones are detected by ultraviolet light, iodine vapor staining or sulfuric acid charring. A sodium azide-iodine spraying reagent prepared as described in Feigl, F., Spot Tests in Organic Analysis, Elsevier Publishing Co., N.Y. (1956) p. 88, may also be used and reveals gliotoxin, a co-produced antibiotic, and the epidithio product (III) as white zones on a dark background. When thin layer chromatography is carried out as described above, the R$_f$ of gliotoxin is 0.30 while the epidithio product (III) has R$_f$ 0.45 using a mixture of chloroform and ethyl acetate (1:1 by volume).

The utility of the new antiviral compounds of the present invention is demonstrated by their ability to control lethal viral infections in mice since they show significant antiviral activity in mice against Coxsackie A21 (Coe) virus. In this test procedure the compound was administered in 3 subcutaneous doses to groups of Carworth Farms male, white mice, weight about 12 grams each and infected by an intraperitoneal injection of a Coxsackie A21 (Coe) virus preparation. The 3 doses of compound, suspended in water, were administered immediately after and at 2 and 4 hours after injection of the virus. Groups of infected, untreated mice were used as controls to show the lethality of the infection. Tables I and II, below, show pooled results, expressed as percent survivors on the 14th day after infection, of two tests run according to the above-described test procedure.

TABLE I.—EFFECT OF COMPOUND (I) ON THE SURVIVAL OF MICE INFECTED WITH COXSACKIE A21 (COE) VIRUS

| Treatment | Each dose, mg./kg. | Survival ratio | Percent survivors |
|---|---|---|---|
| Epitrithio compound (I) | 60 | 8/15 | 53.3 |
| Infected, untreated controls | | 0/30 | 0 |

TABLE II.—EFFECT OF COMPOUND (II) ON THE SURVIVAL OF MICE INFECTED WITH COXSACKIE A21 (COE) VIRUS

| Treatment | Each dose, mg./kg. | Survival ratio | Percent survivors |
|---|---|---|---|
| Epitetrathio compound (II) | 120 | 10/15 | 67.0 |
| Infected, untreated controls | | 3/35 | 8.6 |

The epitetrathio compound (II) was also tested for activity against Influenza B (Maryland) virus. In this test procedure the compound was administered in a single subcutaneous dose to a group of Carworth Farms male, white mice, weight about 20 grams each and infected intranasaly with 0.05 milliliters of a $1\times10^{-3.5}$ dilution (brain, heart infusion broth) with stock virus preparation. The compound was administered immediately after infection. Infected, untreated mice were used as controls to show the lethality of the infection. Table III, below, shows results expressed as percent survivors on the 14th day after infection obtained on a test run according to the above-described procedure.

TABLE III.—EFFECT OF COMPOUND (II) ON THE SURVIVAL OF MICE INFECTED WITH INFLUENZA B (MARYLAND) VIRUS

| Treatment | Each dose, mg./kg. | Survival ratio | Percent survivors |
|---|---|---|---|
| Epitetrathio compound (II) | 90 | 5/20 | 25 |
| Infected, untreated controls | | 0/15 | 0 |

The invention will be described in greater detail in conjunction with the following specific examples.

EXAMPLE 1

Inoculum

A typical medium used to grow the primary inoculum was prepared according to the following formula.

|  | Grams |
|---|---|
| Cerelose | 15 |
| Sucrose | 15 |
| Sodium nitrate | 2 |
| Potassium acid phosphate | 1 |
| Magnesium sulfate.7H$_2$O | 0.5 |
| Potassium chloride | 0.5 |
| Ferrous sulfate.7H$_2$O | 0.01 |
| Beef extract | 0.5 |
| Yeast extract | 0.125 |
| Water to 1,000 milliliters. | |

The washed or scraped spores from an agar slant of *Aspergillus terreus* were used to inoculate two flasks containing 100 milliliters each of the above medium in 500 milliliter flasks. The flasks were placed on a rotary shaker and agitated vigorously for 48 hours, at 28° C. The resulting flask inoculum was transferred to a 5 gallon glass fermentor containing 12 liters of the same sterile medium. The glass fermentor was aerated with sterile air while growth was carried out for about 48 hours, after which time the contents were used to seed a 300 liter tank fermentor.

EXAMPLE 2

Fermentation

A fermentation medium was prepared according to the inoculum medium formula described in Example 1 and sterilized at 120° C. with steam at 15 pounds pressure for 45–60 minutes. The pH of the medium after sterilization was 6.0. Three hundred liters of the sterile medium in a 400 liter tank fermentor was inoculated with 12 liters of inoculum, such as described in Example 1, and the fermentation was carried out at 28° C. Aeration was supplied at the rate of 0.1–0.2 liter of sterile air per liter of mash per minute. The mash was agitated by an impeller driven at 200 revolutions per minute. At the end of approximately 90 hours of fermentation time the mash was harvested.

EXAMPLE 3

Isolation 300 liters of fermented mash were filtered with about 2% (w./v.) of Hyflo®, a diatomaceous earth filter aid, and the filter pad was washed with about 30 liters of water. The filtrate was pooled with the wash (total volume 200 liters) and contains substantially all of the epidithio product (III) produced in the fermentation mash. The pH of the combined filtrate and washings was adjusted to 5.0 with hydrochloric acid. The pH-adjusted solution was extracted with two 30 liter portions of chloroform. The combined chloroform extracts were concentrated at about 34° C. to a volume of about 4 liters. The 4 liters of concentrate was further concentrated using a rotary evaporator to a thick, black colored syrup which was then dried under reduced pressure. The resulting solids were extracted with 150 ml. of chloroform and the residual insoluble material was discarded. The chloroform extract was evaporated to dryness under reduced pressure and the residue was dissolved in 100 ml. of boiling ethanol. A crystalline material (1.2 g.) was formed on cooling of the ethanolic solution and separated by filtration. This material was recrystallized from benzene yielding 166 mg. of light tan crystals, substantially pure epidithio product (III).

EXAMPLE 4

Preparation of 5,5aβ,13,13aβ - tetrahydro - 5β,13β - dihydroxy-8H,16H-7a,15a-epitetrathio-7H,15H - bisoxepino-[3',4':4,5]pyrrolo[1,2a:1',2'-d]pyrazine-7,15-dione, diacetate A solution of 504 milligrams (1.0 mmole) of 5,5aβ,13,13aβ - tetrahydro - 5β,13β - dihydroxy-8H,16H-7a,15a - epidithio - 7H,15H-bisoxepino[3',4':4,5]pyrrolo-[1,2-a:1',2'-d]pyrazine-7,15-dione, diacetate and 128 milligrams (4 mmole) of sulfur in 20 milliliters of dry pyridine was allowed to stand at room temperature for 1.5 hours and then was evaporated to dryness keeping the temperature at or less than 40° C. The residual solid was washed with carbon disulfide. Recrystallization of the washed solid from methylene chloride-ethanol yielded 477 milligrams of ivory-colored crystals which gradually sintered and darkened at temperatures above 205° C.

EXAMPLE 5

Preparation of 5,5aβ,7a,8,13,13aβ,15a,16-octahydro-5β, 13β-dihydroxy-7a,15a-dimercapto - 7H,15H-bisoxepino [3',4':4,5]pyrrolo[1,2-a:1',2'-d]pyrazine - 7,15-dione, O,O-diacetate A solution of 1.000 gram of 5,5aβ,13,13aβ-tetrahydro-5β,13β - dihydroxy-8H,16H-7a,15a-epidithio - 7H,15H-bisoxepino[3',4':4,5]pyrrolo[1,2 - a:1',2' - d]pyrazine - 7, 15-dione, diacetate in 20 milliliters of dry pyridine was saturated wth gaseous methanethiol. After three hours at about 25° C. the resulting crystals were collected and washed with diethyl ether; 0.847 gram, M.P. 252–254° C. (dec.).

EXAMPLE 6

Preparation of 5,5aβ,13,13aβ-tetrahydro - 5β,13β - dihydroxy-8H,16H-7a,15a-epitrithio - 7H,15H - bisoxepino [3',4':4,5]pyrrolo[1,2-a:1',2'-d]pyrazine - 7,15 - dione, diacetate A suspension of 253 milligrams (0.5 mmole) of 5,5aβ, 7a,8,13,13aβ,15a,16 - octahydro - 5β,13β - dihydroxy-7a, 15a - dimercapto - 7H,15H - bisoxepino[3',4':4,5]pyrrolo [1,2-a:1',2'-d]pyrazine-7,15-dione, O,O-diacetate in 10 milliliters of methylene chloride containing 79.1 milligrams (1.0 mmole) of dry pyridine was swirled during the dropwise addition of a solution of 51.5 milligrams (0.5 mmole) of sulfur dichloride (freshly distilled from 0.5% by volume of diethyl phosphite and stabilized with 0.008 mole percent of diethyl phosphite) in 5 milliliters of methylene chloride. The solid dissolved immediately. After 15 hours at about 25° C. the reaction solution was washed three times with water, dried over magnesium sulfate, and then concentrated. It deposited 119 milligrams of ivory-colored crystals. In deuterochloroform solution, a nuclear magnetic resonance signal ascribable to the acetate groups appeared as a sharp singlet at 2.11δ. This contrasts with signals at 2.00δ and 2.17δ seen with the analogous dithio and tetrathio compounds, respectively, and indicates that the present trithio compound is not merely a fortuitous mixure of the dithio and tetrathio species.

We claim:

1. The compound 5,5aβ,13,13aβ-tetrahydro-5β,13β-dihydroxy - 8H,16H - 7a,15a-epitrithio-7H,15H-bisoxepino [3′,4′:4,5]pyrrolo[1,2-a:1′,2′-d]pyrazine-7,15-dione, diacetate.

2. The method of preparing 5,5aβ,13,13aβ-tetrahydro-5β,13β-dihydroxy - 8H,16H - 7a,15a - epitrithio-7H-15H-bisoxepino[3′,4′:4,5]pyrrolo[1,2 - a:1′,2′ - d]pyrazine - 7, 15-dione, diacetate which comprises reacting 5,5aβ,7a,8, 13,13aβ,15a,16-octahydro - 5β,13β - dihydroxy-7a,15a-dimercapto - 7H,15H - bisoxepino[3′,4′:4,5]pyrrolo[1,2-a: 1′,2′-d]pyrazine - 7,15 - dione, O,O-diacetate with sulfur dichloride in a non-aqueous basic solvent at a temperature of from about 10° C. to about 50° C.

3. The compound 5,5aβ,13,13aβ-tetrahydro-5β,13β-dihydroxy - 8H,16H-7a,15a-epitetrathio-7H,15H-bisoxepino [3′,4′:4,5]pyrrolo[1,2-a:1′,2′-d]pyrazine-7,15-dione, diacetate.

4. The method of preparing 5,5aβ,13,13aβ-tetrahydro-5β,13β-dihydroxy-8H,16H-7a,15a - epitetrathio - 7H,15H-bisoxepino[3′,4′:4,5]pyrrolo[1,2 - a:1′,2′ - d]pyrazine - 7, 15-dione, diacetate which comprises reacting 5,5aβ,13, 13aβ - tetrahydro-5β,13β-dihydroxy-8H,16H-7a,15a-epidithio - 7H,15H-bisoxepino[3′,4′:4,5]pyrrolo[1,2-a:1′,2′-d] pyrazine-7,15-dione, diacetate with elemental sulfur in a non-aqueous basic solvent at a temperature of from about 10° C. to about 50° C.

5. The compound 5,5aβ,7a,8,13,13aβ,15a,16-octahydro-5β,13β - dihydroxy-7a,15a-dimercapto-7H,15H-bisoxepino [3′,4′:4,5]pyrrolo[1,2-a:1′,2′-d]pyrazine-7,15-dione, O,O-diacetate.

6. The method of preparing 5,5aβ,7a,8,13,13aβ,15a,16-octahydro - 5β,13β-dihydroxy-7a,15a-dimercapto-7H,15H-bisoxepino[3′,4′:4,5]pyrrolo[1,2 - a:1′,2′ - d]pyrazine - 7, 15-dione, O,O-diacetate which comprises reacting 5,5aβ, 13,13aβ-tetrahydro - 5β,13β - dihydroxy-8H,16H-7a,15a-epidithio - 7H,15H - bisoxepino[3′,4′:4,5]pyrrolo[1,2-a: 1′,2′-d]pyrazine-7,15-dione, diacetate with an alkanethiol in a non-aqueous basic solvent at a temperature of from about 10° C. to about 50° C.

References Cited

Nagarajan et al., J. Am. Chem. Soc., vol. 90, No. 11, pp. 2980–2982 (May 1968).

HENRY R. JILES, Primary Examiner

R. T. BOND, Assistant Examiner

U.S. Cl. X.R.

260—243, 268; 424—244